UNITED STATES PATENT OFFICE.

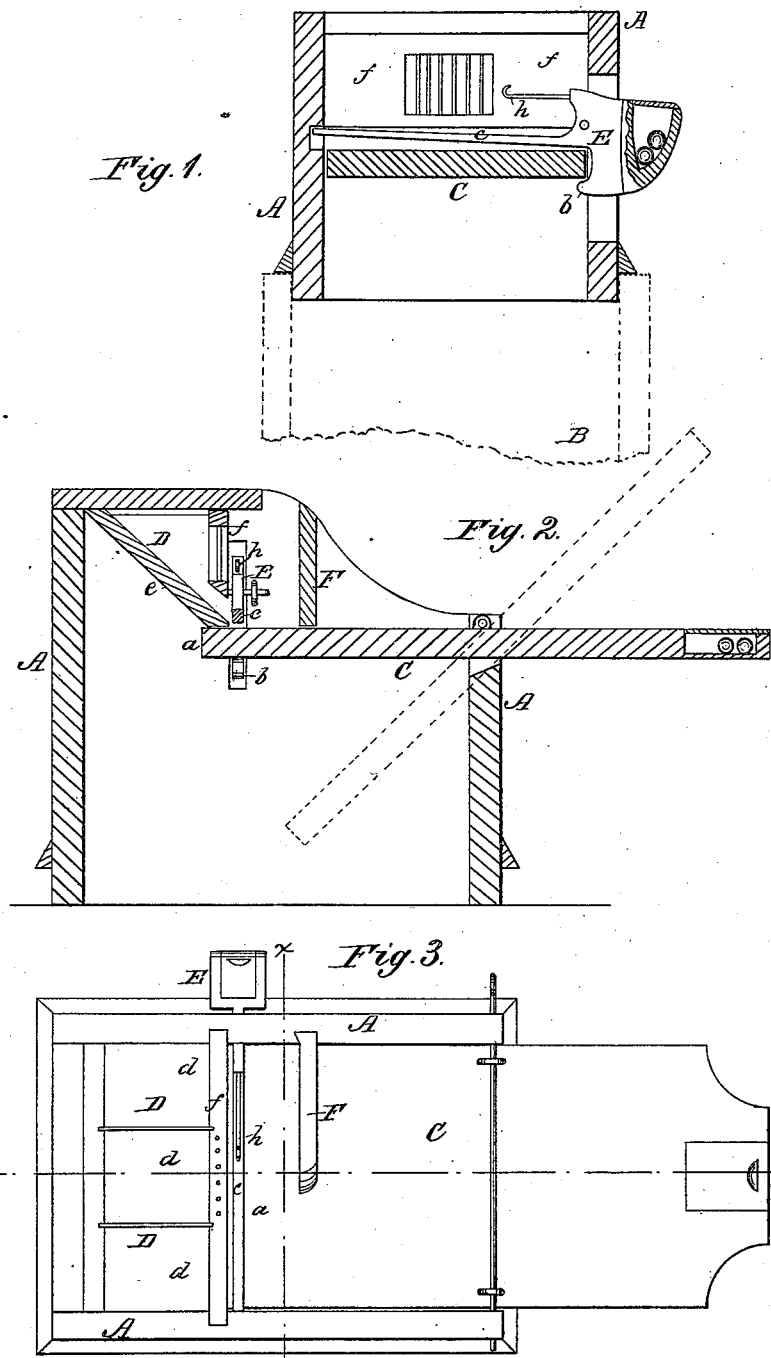

JONATHAN A. NOVINGER, OF NEW BEDFORD, OHIO.

IMPROVEMENT IN ANIMAL-TRAPS.

Specification forming part of Letters Patent No. 211,771, dated January 28, 1879; application filed November 22, 1878.

*To all whom it may concern:*

Be it known that I, JONATHAN A. NOVINGER, of New Bedford, in the county of Coshocton and State of Ohio, have invented a new and Improved Animal-Trap; and I do hereby declare that the following is a full, clear, and exact description of the same.

My invention is an improvement in the class of gravitating platform-traps in which the animal's weight on the platform causes the latter to tilt and precipitate him into a cage or receptacle below whenever the platform is released from a locking-catch by the animal nibbling a bait attached to the latter.

The improvement consists in combining a self-feeding hopper or bait-chamber with a tilting platform, or, in other words, in so constructing and so arranging a bait-chamber with reference to the tilting platform that a small portion of the corn, oats, or other solid food used as bait is discharged therefrom upon the platform each time the latter is reset after an animal has been precipitated into the cage below, so that a fresh bait is supplied to attract another animal.

The invention further consists in the arrangement of the platform and trigger or catch with reference to the apertured bait-box, whereby the animal trips or depresses the latter by attempts to reach the bait in the box or chamber.

In the accompanying drawings, forming part of this specification, Figure 1 is a cross-section of my improved trap on line $x\ x$ of Fig. 3. Fig. 2 is a longitudinal section on line $y\ y$ of Fig. 3. Fig. 3 is a plan view, with the sliding top of the bait-box removed.

The body or main portion of the trap consists of a box, A, which is bottomless and designed, in practice, to set on a box, barrel, or other receptacle, B, which is suitably constructed to serve as a cage for imprisoning the animals precipitated into it by the trap proper.

The platform C is pivoted at or near one end of the box A, and its inner end, $a$, extends beneath the bait-box or hopper D, which is fixed in the upper portion of said box A. The platform is weighted in its outer end to cause the latter to overbalance the inner end. The catch E is pivoted in one side of the box A, and has a claw or shoulder, $b$, which takes under the edge of the platform C, and supports it horizontally until tripped, as hereinafter described. The arm $c$ of said catch E extends across the platform, on the upper side thereof, directly in front of the lower edge of the hopper D, for a purpose hereinafter stated. The hopper has compartments $d$ for receiving different kinds of bait, and the bottom $e$ is inclined to cause the bait to feed or slide forward.

The front $f$ of the bait-box is adjustable vertically, being fitted in grooves in the sides of the box A. Said front is thus adapted to be raised more or less, so as to leave a space of greater or less width between its lower edge and the bottom of the hopper D, through which the animals may seek the bait or the latter be discharged upon the platform.

The operation of the trap is as follows: The lid of box D is drawn back and bait placed therein. The front is also slightly raised and the box A then placed on a suitable cage or prison-receptacle, B. If the trap is set for rats, then such bait as corn, oats, and cheese may be placed in the different compartments. So soon as the animal—say a rat—approaches the bait-box, along the platform, he will perceive the bait through the space or opening at the lower part of the box, and in attempting to reach it will depress the lever-arm $c$ of catch E, and thereby trip the latter and release the platform, which will instantly tilt and precipitate the animal into the cage B. The platform will then rise to its original position, and the catch E again engage with and support the same until again tripped as before. In rising the inner end of the platform strikes against the under side of the hopper and thereby jars the same sufficiently to cause some of the bait to fall out through the opening upon the platform to attract another animal. The feed or discharge of bait is thus effected automatically.

In some cases I may attach bait to the hook $k$, which extends from the catch E above the arm; and I may also employ the guard F, preferably when the trap is used for catching mice. Said guard is a short vertical partition or plate, which extends from the side of the box A over the platform. The same is detachably connected or else hinged to the side of the box A, so that it may be removed or else swung out of the way when desired.

When the guard F is used, the mice will pass around it and enter the space between it and the front of the bait-box. When the platform is tripped, the guard will thwart any attempt of the animal to escape by running rapidly up the platform when it begins to tilt.

Instead of arranging the arm of catch E in front of the opening of the bait-box, it may be located just below the opening or along the lower edge thereof.

I am aware it is not new to employ a catch to support the end of a tilting platform which is contiguous to, or projects beneath, a bait-box; but in my case the catch is so constructed and arranged as to extend entirely across the end of the platform, in such contiguity to the discharge-opening of the bait-box that in an attempt of the animal trapped to get access to the bait it will rest its fore paws on the arm of the catch, and thereby depress it.

What I claim is—

1. In an animal-trap, the combination of a gravitating or tilting platform with a bait-box having an opening, as described, through which the bait is caused to discharge upon the platform when the latter rises and comes in contact with the lower side of said bait-box, substantially as shown and set forth.

2. In an animal-trap, the combination of the tilting platform, the bait-box having an inclined floor, and the vertically-adjustable front, substantially as shown and described.

3. In an animal-trap, the combination, with the tilting platform and the bait-box having a discharge-opening, as specified, of the catch E b, pivoted in one side of the box A, and having an arm, c, extended across the platform in front of, and contiguous to, said opening, as shown and described, for the purpose specified.

The above specification of my invention signed by me this 18th day of November, A. D. 1878.

JON. A. NOVINGER.

Witnesses:
  SOLON C. KEMON,
  CHAS. A. PETTIT.